March 10, 1942.  J. W. LEIGHTON  2,276,050
METHOD OF CONNECTING A PIN TO A BAR
Filed May 1, 1940
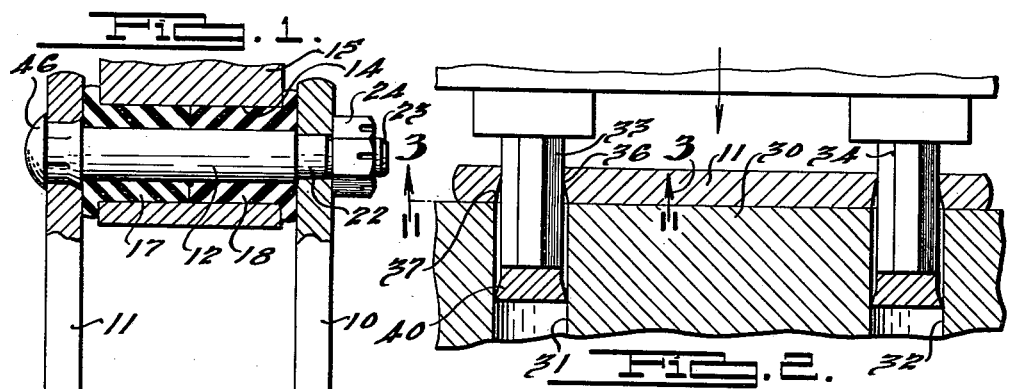
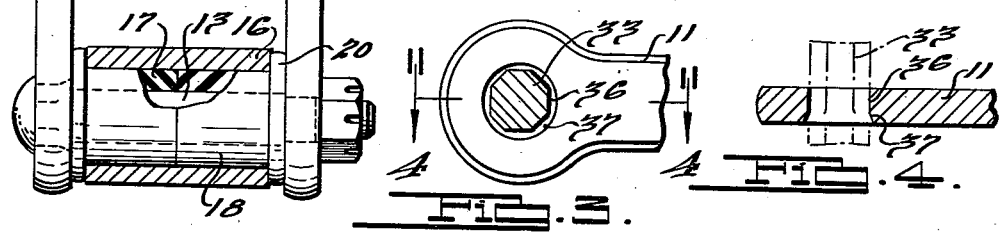
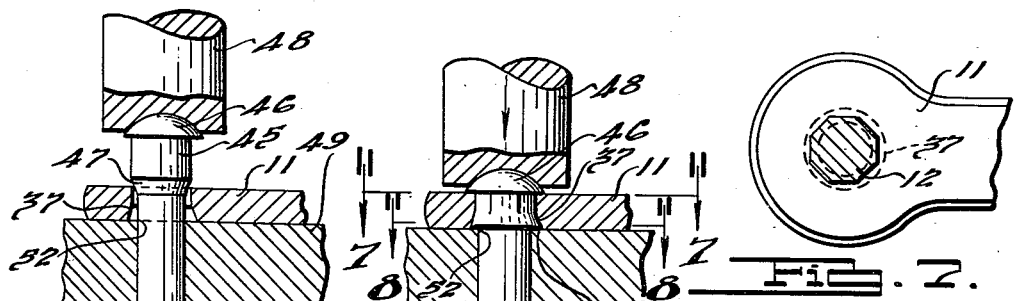
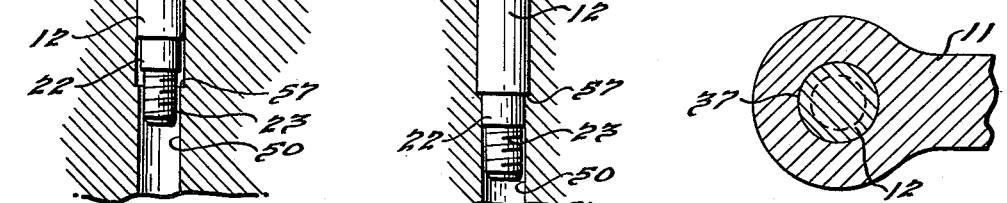
INVENTOR
John W. Leighton.
BY
Harness, Dickey & Pierce.
ATTORNEYS.

Patented Mar. 10, 1942

2,276,050

UNITED STATES PATENT OFFICE 2,276,050

METHOD OF CONNECTING PINS TO BARS

John W. Leighton, Port Huron, Mich.

Application May 1, 1940, Serial No. 332,649

7 Claims. (Cl. 29—148)

The invention relates generally to automobiles and it has particular relation to improvements in spring shackles.

Also, the invention constitutes a continuation in part of my copending application for patent, Serial No. 291,959, filed August 25, 1939.

One object of the invention is to provide a simple and inexpensive method of connecting a spring shackle side bar to a trunnion or pin, which, in the completed assembly, projects laterally from the bar.

Another object of the invention is to provide a method of connecting the side bar to the pin or trunnion which at the same time accurately fixes the length of the projecting portion of the trunnion.

And in general it is an object of the invention to provide an improved connection between a bar and a pin or trunnion projecting therefrom, which is simple, durable, and inexpensive to construct.

Other objects of the invention will become apparent from the following specification, from the claims hereinafter set forth, and from the drawing to which the specification relates.

For a better understanding of the invention, reference may be had to the drawing, wherein:

Figure 1 is an elevational view, partly in cross-section, showing a spring shackle constructed according to one form of the invention;

Fig. 2 is a cross-sectional view showing a die and punches for forming openings in the side bar of the shackle;

Fig. 3 is a cross-sectional view taken substantially along the line 3—3 of Fig. 2;

Fig. 4 is a cross-sectional view taken substantially along the line 4—4 of Fig. 3;

Fig. 5 shows a relation of assembly dies, trunnions, bar, and punch for assembling and connecting the trunnions and bar;

Fig. 6 is a view on the order of Fig. 5, but showing the parts finally connected;

Fig. 7 is a cross-sectional view taken substantially along the line 7—7 of Fig. 6;

Fig. 8 is a cross-sectional view taken substantially along the line 8—8 of Fig. 6.

Referring to Fig. 1, the shackle illustrated comprises side bars 10 and 11 interconnected by trunnions or pins 12 and 13 located respectively at opposite ends of the bars. The pin 12 is shown as projecting through an opening 14 in a vehicle frame member 15 while the pin 13 is shown as projecting through an eye 16 of a leaf spring. Rubber bushings 17 and 18 are disposed around each of the pins and within the openings in the frame and spring and such bushings have outwardly directed flange portions 20 which project outwardly along side bars. Each of the pins is secured positively and rigidly to the bar 11 and has a reduced cylindrical portion 22 located in an opening in an end of the other side bar 10. The outer end of the pin is threaded as indicated at 23 and a nut 24 on the threaded end tightly locks the pin to the side bar 10, with the shoulder at the inner end of the portion 22 abutting the inner side of the bar. This shoulder definitely limits axial compression of the rubber bushings and it will be understood that the flanges 20 may be initially formed on the bushings, or they may be formed by axial compression of such bushings when the nuts 24 are tightened. Axial compression of the bushings frictionally binds them in the openings and to the surface of the pins, and thus during any oscillatory movement of the shackle, the movement is resisted through circumferential twisting of the rubber. If desired, the rubber may be bonded to the pins and also bonded to the vehicle frame member and spring leaf to be desirable.

Attention now will be directed to the connection between the pins and the side bar 11 since the invention deals particularly with this connection and the method of obtaining it.

Referring to Figs. 2, 3, and 4, the side bar 11 is placed on a die 30 having round openings 31 and 32 and is disposed under punch elements 33 and 34. The punch elements are of octagonal cross section and the openings 31 and 32 are slightly larger in diameter than that of the punch elements and this relation of size of die opening and punch element is shown particularly by Fig. 3. Now when the punch elements are moved downwardly, the punches form openings in the side bar 11 that are generally octagonal in substantially the upper half of the opening as indicated at 36, while substantially the lower half of the opening as indicated by the numeral 37 is generally conical, tapering from the end of the octagonal part of the opening to a larger end which corresponds in size to that of the openings 31 and 32 in the die 30. Formation of the tapered part 37 of the opening occurs automatically owing to the relative sizes of the punch and die openings and slugs removed from the bar during the formation of the openings are indicated by the numerals 40.

Each of the pins 12 and 13, in addition to the structure specified previously, has an enlarged end portion 45 adjacent a head 46, and between the main body of the pin and the enlarged portion 45, a tapered shoulder 47 is provided. In assembling each pin with the side bar 11, an upper punch 48 is employed in conjunction with a lower die member 49 and this lower die member has an opening 50 slightly larger than the main body of the pin so that it may freely slide thereon. It may be noted also that the enlarged portion 45 of the pin is slightly larger than the octagonal opening so that pressure is required to force it therethrough. Now when the punch 48 is moved downwardly, the pin is moved downwardly through the opening in the bar and the enlarged portion 45 of the pin is forced through the octagonal portion of the opening in the side member and an interlocking engagement occurs between the opening and the enlarged portion by deformation of metallic portions so that the pin is positively locked against rotary movement in the opening. As the pin continues to move through the die opening 50, the tapered portion 47 engages a corner 52 of the die and continued movement of the pin causes metal to be forced outwardly into the tapered portion of the opening in the side member to substantially fill such opening as indicated at 55. Due to the fact that the corner 52 which engages the taper 47 on the pin is closely adjacent the surface of the main body of the pin, metal is forced toward the head 46 as the punch 48 moves and the space is so slight between the main body of the pin and the opening 50, that metal is prevented from extruding towards the threaded end of the pin. Moreover, resistance to upsetting of the metal into the tapered portion of the opening increases but gradually and if and when such resistance should become sufficient to cause extension of the metal towards the threaded end under other circumstances, the corner 52 has moved so far over the shoulder with acompanying close fit of shoulder and opening, that the extension mentioned cannot occur.

Attention is now directed to the fact that the lower part of opening 50 in the die 49 is of slightly reduced diameter to provide a shoulder 57. This shoulder is adapted to engage the shoulder on the pin at the upper end of the portion 22 of the pin, so as to definitely fix the lower limit of the main cylindrical body of the pin when the latter is moved downwardly. The dimensions of the parts normally will be such that the shoulders on the pin and in the opening will definitely engage or contact and thus the length of the main cylindrical body portion of the pin projecting from the bar will be uniformly accurate, and the distance between the two shackle bars will be exactly the same in all cases. When the shoulders on the pin and in the opening engage, it may be that the head on the pin is slightly away from the surface of the bar and in this event, upsetting of the metal in the upper end of the pin between the corner 52 and the punch 48 will continue at least to tightly anchor the pin and bar together. Usually any additional upsetting after the shoulders contact will be slight and normally the corner 52 will practically effect filling of the tapered part 37 of the bar opening before the shoulders contact.

From this, it should be appreciated that the pins and bar may be connected rapidly with the assurance that the length of the main cylindrical body portion of the pins projecting from the bars will be accurate and uniform. Hence, the shackle parts as finally assembled will have the desired dimensional relation. Rapid, accurate and uniform construction thus characterize the method of manufacturing.

With the metal upset into the tapered portion of the opening, the pin is locked positively against axial movement in the opening and the octagonal engagement between the pin and the side bar, as well as the pressure fit of the pin in the opening, locks the pin against turning.

It is a simple manufacturing operation to form the openings in the side member and to assemble the pins and the side members since only pressure operations are required, using a punch and a lower die member. Manufacture of the pins may be effected by means of automatic machinery, as will be understood. Bar members 10 and 11 can be formed from wire of predetermined size which is upset at each end to form ball formations and then the wire may be flattened to provide a flat side bar with enlarged circular end portions in which the openings are to be formed. The manufacture of the side bars, pins, and nuts for the pins thus may be effected very inexpensively, and this, plus the simplicity of assembly, renders the structure less expensive than known other ways of connecting pins to side bars.

Although only one form of the invention has been illustrated and described in detail, it will be apparent to those skilled in the art that various modifications may be made without departing from the scope of the appended claims.

What is claimed is:

1. The method of connecting a pin or trunnion to a bar or the like, which comprises forming an opening in the bar wherein the opening is polygonal at one end and is enlarged at its other end, providing a pin with a shank portion and a larger rounded portion to be disposed in the opening and which larger portion is of such size that when forced into the polygonal portion the metal is pressed into rotary interlocking engagement, providing an axially tapered shoulder between the two portions of the pin, inserting the pin into the opening and forcing the enlarged portion into rotary locking engagement with the opening, and relatively moving a die substantially fitting the smaller shank portion axially against the shoulder to force the metal outwardly into the enlarged part of the opening.

2. The method of connecting a pin or trunnion to a bar or the like which comprises forming an opening in the bar, providing a pin which has a portion to be disposed in such opening, a smaller body portion to project from the bar, and an axially tapered shoulder joining the two portions, providing a die having an opening slightly larger than the smaller portion of the pin, placing the bar on the die, forcing the pin through the bar opening and into the die opening so that the die forces the metal in the tapered shoulder outwardly to form an abutment on the pin at the side of the bar, and limiting movement of the body portion of the pin into the die opening by shoulder means in the latter so that the length of the body portion of the pin will be definitely fixed.

3. The method of connecting a pin or trunnion to a bar or the like, which comprises punching a hole through the bar with a punch at one side while supporting the bar at the other side by a die having an opening larger than the punch so as to have the opening flared into larger diameter at the die supported end, inserting a pin through the opening, providing a head on the pin to engage that side of the bar opposite the flared out end of the opening, and upsetting the pin outwardly into the flared out end of the opening at the other side of the bar so as to lock the pin to the bar at both ends of the opening.

4. The method of connecting a pin or trunnion to a bar or the like, which comprises punching a hole through the bar from one side with a punch polygonal in cross-section while supporting the other side of the bar with a die having an opening larger than the punch so as to have the opening polygonal for a portion of its length and then flaring into larger diameter at the die supported side of the bar, inserting a pin through the opening, providing a head on the pin to engage that side of the bar opposite the flared out end of the opening, and upsetting the pin axially to bind it tightly in the polygonal part of the opening and to effect a flow of metal into the flared out end of the opening.

5. The method of connecting a pin or trunnion to a bar or the like, which comprises forming an opening in the bar wherein the opening has a first part generally of uniform size at one end and flared part of larger dimensions at its other end, providing a pin with a shank portion and a larger cylindrical portion to be disposed in the opening and which larger portion is of such size that when forced into the first part of the opening the metal is pressed into rotary interlocking engagement, providing an axially tapered shoulder between the two portions of the pin, inserting the pin into the opening and forcing the enlarged portion into rotary locking engagement with the opening, and relatively moving a die substantially fitting the smaller shank portion axially against the shoulder to force the metal outwardly into the flared part of the opening.

6. The method of connecting a pin or trunnion to a bar or the like, which comprises punching a hole through the bar from one side while supporting the other side of the bar with a die having an opening larger than the punch so as to have a first portion of the opening corresponding to the punch in size and then flaring into larger diameter at the die supported side of the bar, inserting a pin through the opening, providing a head on the pin to engage that side of the bar opposite the flared out end of the opening, and upsetting the pin axially to bind it tightly in the first portion of the opening and to effect a flow of metal into the flared out end of the opening.

7. The method of connecting a pin or trunnion to a bar or the like which comprises forming an opening in the bar, providing a pin which has a portion to be disposed in such opening, a smaller body portion to project from the bar, and a shoulder joining the two portions, providing a die having an opening slightly larger than the smaller portion of the pin and smaller than the larger diameter of the shoulder, placing the bar on the die, inserting the pin through the bar opening and into the die opening so that the die forces metal at the shoulder outwardly, and limiting movement of the body portion of the pin into the die opening by shoulder means in the latter so that the length of the body portion of the pin will be definitely fixed.

JOHN W. LEIGHTON.